Figure 1:
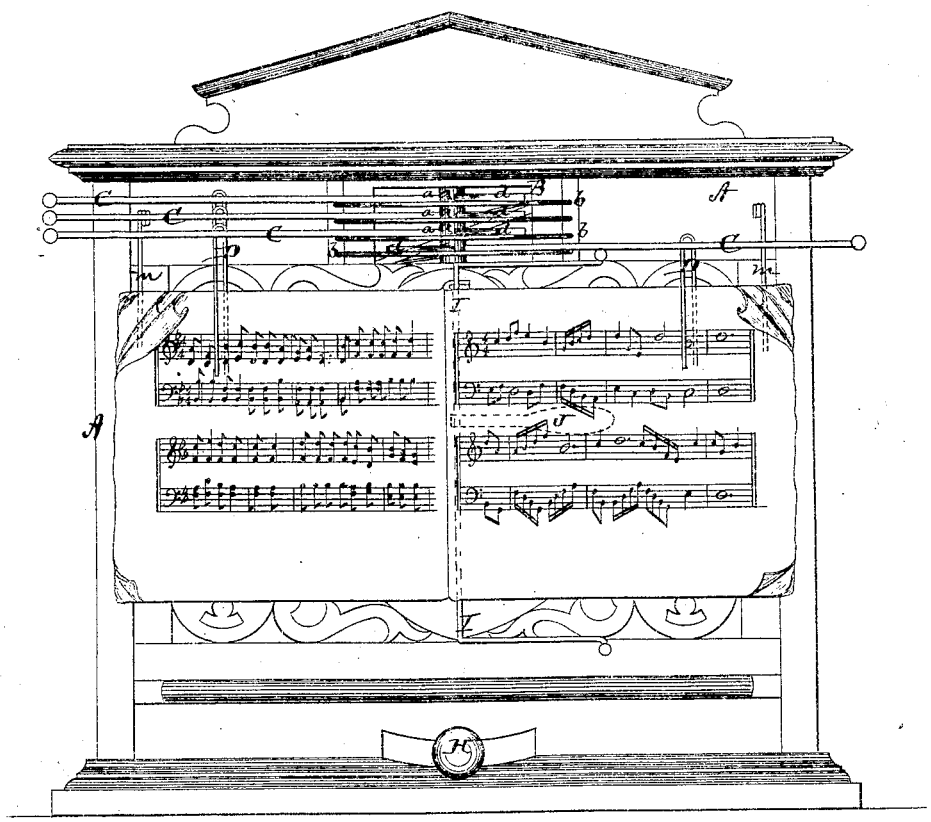

C. P. BROWN.
Improvement in Music-Leaf Turners.

No. 126,516.   Patented May 7, 1872.

Witnesses:
Henry N. Miller
C. L. Evert

Inventor
Cyril P. Brown
per
Alexander Mason
Attorneys.

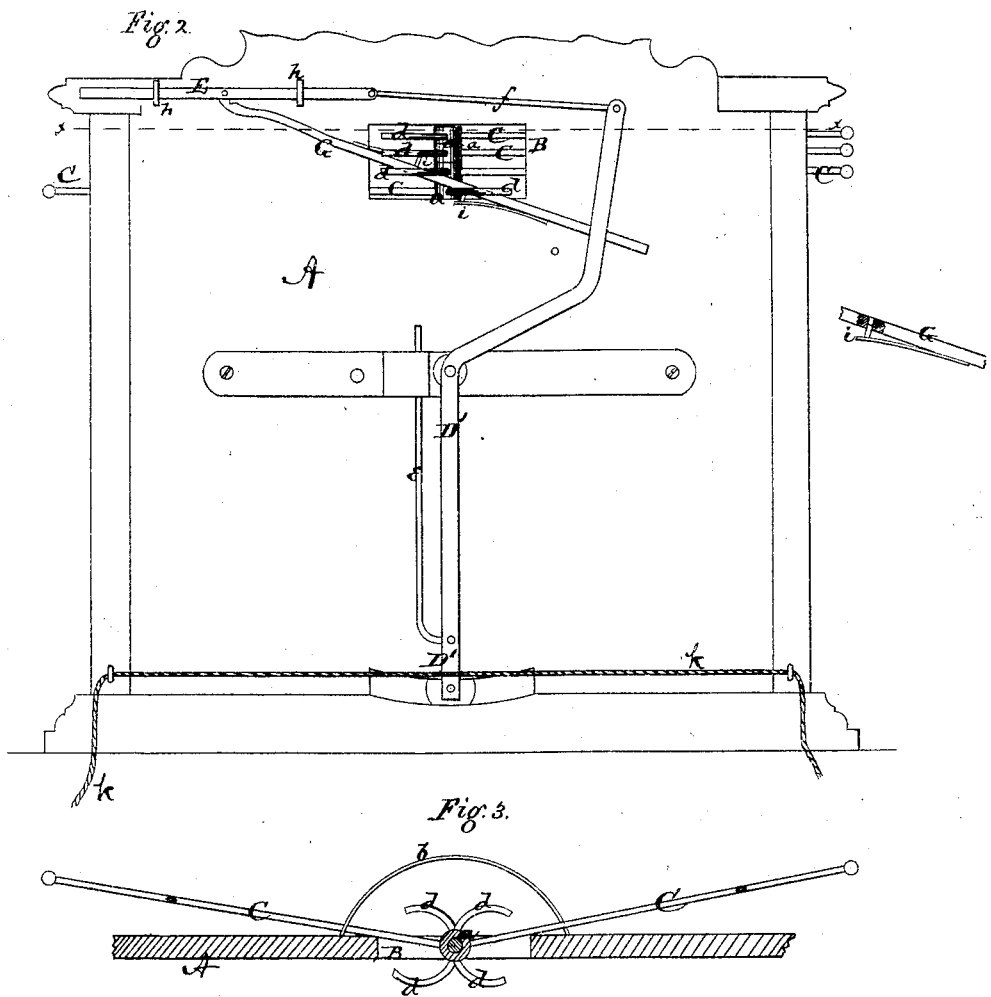

126,516

UNITED STATES PATENT OFFICE.

CYRIL P. BROWN, OF SPRING LAKE, ASSIGNOR TO HIMSELF, JAMES O. BATES, OF SAME PLACE, AND WILLIAM M. ROBINSON, OF FRUIT PORT, MICH.

IMPROVEMENT IN MUSIC-LEAF TURNERS.

Specification forming part of Letters Patent No. 126,516, dated May 7, 1872.

*To all whom it may concern:*

Be it known that I, CYRIL P. BROWN, of Spring Lake, in the county of Ottawa and in the State of Michigan, have invented certain new and useful Improvements in Music-Turner; and do hereby declare that the following is a full, clear, and exact description thereof, reference being had to the accompanying drawing and to the letters of reference marked thereon making a part of this specification.

The nature of my invention consists in the construction and arrangement of a "music-turner" for pianos, organs, or other instruments, as will be hereinafter more fully set forth.

In order to enable others skilled in the art to which my invention appertains to make and use the same, I will now proceed to describe its construction and operation, referring to the annexed drawing, in which—

Figure 1 is a front elevation, and Fig. 2 a rear view of my music-turner. Fig. 3 is a horizontal section through line *x x* of Fig. 2.

A represents the music-board, in the center of which, near the upper end, is a mortise or opening, B. In the center of this opening is an upright rod or shaft, upon which is placed a series of collars or hubs, *a a*. From each of said hubs projects forward a vibrating arm or finger, C, in which a fork, D, is inserted, each of said fingers resting upon a semicircular guide, *b*, arranged on the front of the music-board. Each hub is also provided with two curved spokes, *d d*, extending in rear of the music-board. These spokes are inserted in the hub, one on each side of and ninety degrees from the finger C. On the rear of the music-board is pivoted a lever, D', having a spring, *e*, attached to its lower end to keep it in proper position, and its upper end is, by a pitman, *f*, connected with a sliding bar, E, which moves horizontally in guides *h h*. To this sliding bar E is hinged or pivoted a catch-bar, G, having two spring-catches, *i i*, as shown. The object of the curvature of the spokes *d d* is as follows: When the catches *i i* on the catch-bar G strike the spoke they follow this curvature in its revolution until the finger-bar C has passed the center. The spokes also regulate the position or adjust the catch-bar G, as will be hereinafter described. The arms or fingers C C, with the forks D D, carry the music either way. These forks pass through two holes in their respective finger-bars and are held in position by friction. If they come down too far on the music they may be raised, holding themselves in any position in which they may be placed. The hubs *a a*, to which the fingers and spokes are attached, maintain, by their thickness, a proper distance between the spokes for the free play between them of the catch-bar G. The catch-bar G consists, as shown, of a rod resting on an inclined plane, and the two catches *i i*, which are self-adjusting, are placed near its center on opposite sides of each other. The object of the inclination of the catch-bar is, that when either catch strikes a spoke, and as the finger-bar makes its half revolution, one spoke will pass over and the other under the bar, according to the direction the bar is moving, the effect being either to raise or lower the bar, allowing the bar to turn the whole combination of fingers one way or the other, or any one finger in either direction, thus rendering the instrument self-adjusting for turning music in the whole or leaf by leaf in opposite directions. Again, it will be observed that the catch-bar moves from a common point either forward or backward, so that as the catch strikes the spoke and moves the finger in a given direction it adjusts itself to the common point, and then and there, by the reverse motion, turns the finger back to its first position, and so on through the entire combination. The catches *i i* are placed one on the upper and the other on the lower side of the catch-bar G, and the spoke when at rest is between them, so that in operating the machine it may turn the finger below or above, as desired by the operator, or immediately reverse the position of the finger, as before explained. The catches, when playing between the spokes in working, may close down on the rod, preventing resistance or impeding the movement of the machine. After passing between them they instantly open, ready to strike the spoke desired, carrying them in either direction. To the lower end of the lever D is attached a knob or handle, H, projecting through a slot or mortise in the music-board, for operating the machine by hand; or it may be operated by the feet, by means of cords *k k* attached to the lever D' and connecting with pedals underneath. On each side of the front of the music-board is a spring, m, for holding the fly-leaf or other music not wanted from being drawn over by suction. In the center of the music-board is a music-holder, I, for holding the music in its position before being adjusted to the forks. Attached to the holder I is a lever, J, for raising the holder before placing the music under the same. This device adjusts itself by means of a spring placed under the lever.

The mode of operating the machine is as follows: The fingers C C are thrown over to the left of the machine. The music is then placed under the holder I; it is then turned by the left hand on itself to clear the forks D D; now touch the knob or key H, turning one of the fingers C to the right, and a sheet of music is then slipped between the fork on the same, and so on until the whole is adjusted. The first and last leaves are held by the springs m m from being drawn over by suction. The machine is operated by the foot by passing the cords k k through pulleys at the sides of the music-board; then through the piano anterior to the sounding-board, or by means of other pulleys over the back or sides of the instrument to pedals beneath, and the same for organs, melodeons, &c.

The music-turner may be placed at once on any instrument ready for use and readily manipulated by touching the key or knob H, moving it in the direction the music is intended to be turned. The motion to the key should be quick, as in striking a piano-key, at once removing the hand or foot that the catch-bar may instantly adjust itself.

Having thus fully described my invention, what I claim as new, and desire to secure by Letters Patent, is—

1. The fork D, adjusted and held by friction at any height in holes on the arm C, substantially as and for the purposes herein set forth.

2. The curved spokes d d, attached to the base or support of the arms in a music-turner, which carry the sheets of music, substantially as and for the purposes herein set forth.

3. The combination of the hub a, arm or finger C, adjustable fork D, and the curved spokes d d, all constructed and arranged substantially as and for the purposes herein set forth.

4. The combination of a series of hubs or collars, a a, on a common rod or shaft, each hub being provided with two curved spokes, d d, and a finger, C, having an adjustable fork, D, and the stationary guides b b, all substantially as and for the purposes herein set forth.

5. The catch-bar G, operating on a movable or changeable incline and provided with the the self-adjusting catches i i, substantially as and for the purposes herein set forth.

6. The combination of the fingers C C, hubs a a, spokes d d, catch-bar G, and catches i i, all constructed and arranged to operate substantially as and for the purposes herein set forth.

In testimony that I claim the foregoing I have hereunto set my hand this 5th day of February, 1872.

CYRIL P. BROWN.

Witnesses:
 JOHN LEE,
 W. B. HUMMER.